UNITED STATES PATENT OFFICE.

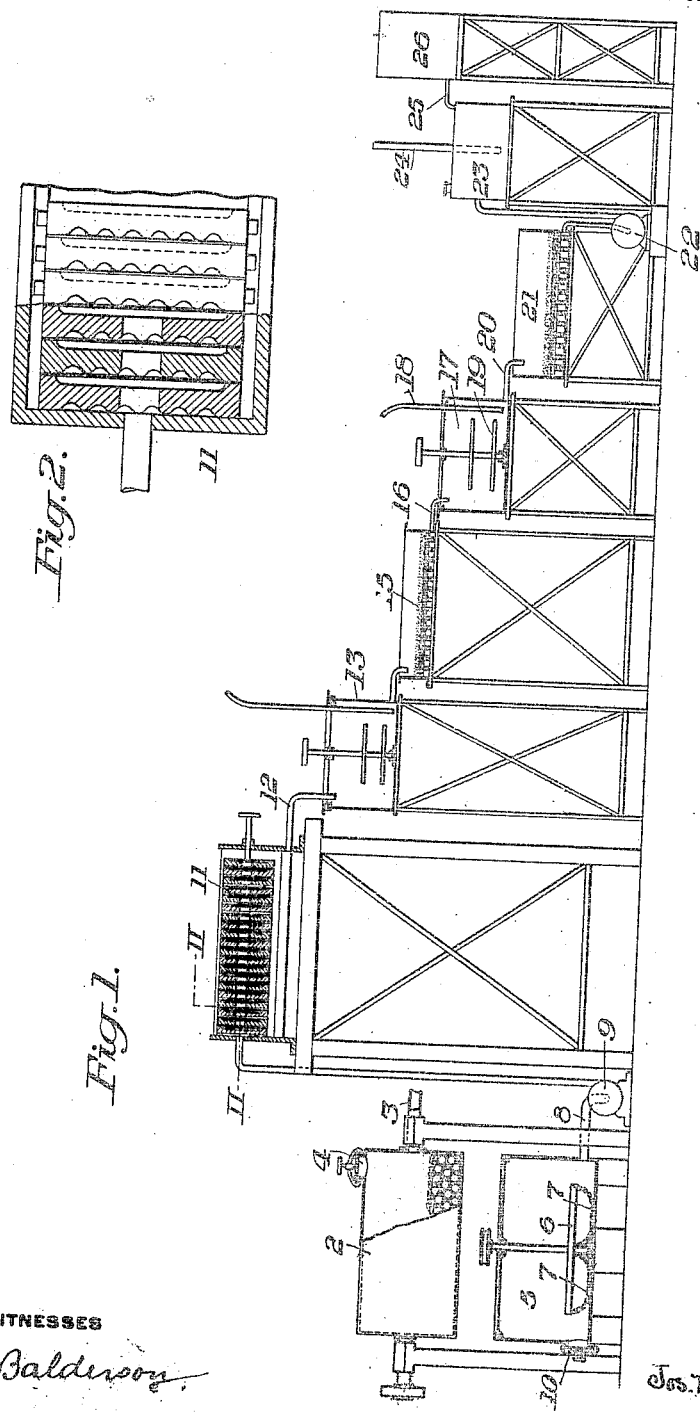

JOSEPH McFETRIDGE, OF VANDERGRIFT, PENNSYLVANIA, ASSIGNOR TO AMERICAN SHEET & TIN PLATE COMPANY, OF PITTSBURGH, PENNSYLVANIA, A CORPORATION OF NEW JERSEY.

PROCESS FOR RECLAIMING AMMONIUM AND ZINC VALUES FROM SAL-AMMONIAC-FLUX SKIMMINGS.

1,044,557.

Specification of Letters Patent.  Patented Nov. 19, 1912.

Application filed December 11, 1909. Serial No. 532,654.

*To all whom it may concern:*

Be it known that I, JOSEPH McFETRIDGE, of Vandergrift, Westmoreland county, Pennsylvania, have invented a new and useful Process for Reclaiming Ammonium and Zinc Values from Sal-Ammoniac-Flux Skimmings, of which the following is a full, clear, and exact description, reference being had to the accompanying drawings, forming part of this specification, in which—

Figure 1 is an elevation partly in section, and largely diagrammatic, of apparatus which may be employed in carrying out my invention; and Fig. 2 is a detail sectional view of a portion of one of the filters which may be employed.

My invention has relation to a novel method of reclaiming ammonia and zinc values from sal-ammoniac flux skimmings. The skimmings are a by-product obtained when sal-ammoniac is used as a flux in galvanizing steel or iron, the bath of molten zinc being protected from the action of the air by sal-ammoniac. They consist of a mixture of zinc oxid, zinc chlorid, zinc oxychlorid, metallic zinc and chlorid of ammonium, with small quantities of ferrous chlorid, oxid of iron, tin and lead. The proportions of the various ingredients depend very largely on the exact nature of the shop practice where the skimmings are produced.

When sal-ammoniac is used as a flux or protective coating for a zinc bath, the flux is replenished from time to time by the addition of fresh sal-ammoniac. This sal-ammoniac is continually decomposing, forming zinc chlorid, which dissolves the oxid of zinc from the surface of the zinc bath, forming oxychlorids. When the flux becomes highly charged with chlorid, oxid and oxychlorid of zinc, it is skimmed off by means of perforated ladles or skimmers, more or less metallic zinc being removed with the skimmings in the form of fine granules. On cooling, the skimmings solidify into a hard rock-like mass. Heretofore a portion of the zinc has been recovered from these skimmings by well known pyro methods of extracting zincs from ores; also by steaming the skimmings for several days, recovering in a liquid form the soluble zinc and ammonium salts and smelting the insoluble residue to recover zinc values therefrom. In the first of these methods the volatile zinc and ammonium chlorids are lost; and in the second method, the insoluble zinc salts are of value only as zinc ore.

According to prior methods of removing the soluble salts by weathering or subjecting to steam, the soluble salts on the surface of each lump or particle are dissolved, leaving a light film or protective coating of oxid of zinc on the surface of each lump. This light film of oxid retarded action so that the mass could be disintegrated and the soluble portions dissolved out only after long contact.

The object of my invention is to recover, by a rapid and convenient process, from these skimmings the ammonium and zinc values contained therein. The ammonium values are recovered in the form of a hydrate, sulfate or chlorid. The soluble zinc salts are recovered as carbonate of zinc; and the insoluble zinc salts are recovered as zinc oxid and metallic zinc.

The features of my invention which most prominently distinguish it from the prior methods known to me, are the rapidity with which the rock-like mass of salammoniac skimmings is disintegrated, the soluble salts separated from the insoluble, and the soluble zinc salts converted into zinc carbonate of such purity as to be available for the drug trade or for fine pigments. Also the recovery of the ammonium as commercial hydrate, sulfate, or chlorid of ammonium; also the conversion of the insoluble oxid and oxychlorid of zinc into oxid of zinc suitable for use as a commercial pigment, while the metallic zinc is reclaimed as such and can be used for galvanizing iron or steel.

I will now describe in detail the preferred method of carrying out my invention. In accordance therewith, the sal-ammoniac skimmings are first broken into a convenient size for handling, and are digested with water in a suitable mill, preferably a ball mill, such as indicated at 2 in Fig. 1, being maintained at a temperature of from preferably 160 to 180 degrees Fahrenheit by admitting live steam through the hollow shaft 3 of the mill. The water at once dissolves the soluble salts on the surface of the mass, and by rotating the mill, the friction of the grinding balls on the charge of sal-ammoniac skimmings removes the light film of oxid of zinc to thereby constantly expose fresh surfaces for the action of the hot water. In from one to two hours the charge is disintegrated, the soluble salts being in solution, the fine insoluble oxids and oxychlorids being held in suspension, and the metallic zinc free from zinc salts being in granular form. The charge is then removed from the digester 2 through a suitable opening 4, and is admitted into a wooden tank 5, which is provided with rotary agitating arms 6 and a drag chain 7. The charge is kept in a state of gentle agitation in this tank by the rotating arms 6, the fine insoluble oxid and oxychlorids of zinc being held in suspension, while the granules of metallic zinc drop to the bottom and are freed from adhering oxids by the drag chain 7. The soluble chlorids and suspended oxids and oxychlorids are drawn off through a pipe 8 to a centrifugal pump 9. The metallic zinc is removed from the tank 5 through the gate 10 and is returned to the galvanizing department, or is melted and cast into slabs of commercial zinc.

From the pump 9, the liquor is forced into the filter press 11, which may be of any suitable character, and the soluble zinc and ammonium chlorid contained therein are separated from the insoluble zinc oxid and oxychlorid. The mixture of oxid and oxychlorid of zinc is mixed with caustic lime in quantities equivalent to the chlorin contained in the oxychlorid, and are furnaced at a dull red in a muffle furnace. The oxychlorid of zinc is decomposed by the lime and heat, forming chlorid of calcium and oxid of zinc. The oxid of zinc formed by the decomposition of the oxychlorid of zinc, together with the oxid of zinc originally present, are separated from the chlorid of calcium by digesting with water in a suitable agitating tank, and then filtering, both being reclaimed as oxid of zinc, which may be used as pigment.

The zinc and ammonium chlorid liquor separated from the oxid and oxychlorid of zinc by the filtering press 11, flows through a pipe 12 into an oxidizing agitator 13. In this agitator the small percentage of ferrous chlorid present is converted into ferric chlorid by treating with a suitable oxidizing agent, preferably chlorin. When the iron has been converted to the higher chlorid, it is precipitated in the agitator 13 by adding oxid of zinc, or by carbonate of zinc formed by adding carbonate of soda in such quantities that from one-half to one per cent. of zinc chlorid is decomposed to form carbonate of zinc, which, like the oxid of zinc, has the property of precipitating iron in the form of peroxid from solutions of zinc chlorid when the iron is in the form of ferric chlorid. The precipitated iron is removed from the liquor by passing it through a suitable filter 15. The clear liquor from the filter 15 flows by gravity through a pipe 16 into a precipitating tank 17. The liquor is heated in this tank to near its boiling point by means of live steam admitted through pipe 18. The liquor is kept in a state of gentle agitation by suitable rotating stirring arms 19, and a hot carbonate of soda solution is added until all the zinc is precipitated as carbonate. The liquor with the suspended carbonate of zinc is drawn off through pipe 20 into a suitable filter 21, where the zinc carbonate is separated. This carbonate of zinc may be dried and sold as such, or it may be converted into zinc oxid by furnacing in a suitable muffle furnace to expel the carbonic acid.

The liquor from the filter 21 may be elevated by a centrifugal pump 22 into an iron still 23, and there treated with milk of lime to decompose the ammonium salts and liberate free ammonia. This free ammonia is expelled by live steam admitted through a pipe 24, and is carried through pipe 25 into an absorption tower 26, where it is absorbed in water, sulfuric acid or hydrochloric acid to form either a hydrate, sulfate or chlorid of ammonium.

It will thus be seen that my invention provides a simple and effective process of a continuous nature, whereby all the zinc and ammonium value contained in the sal-ammoniac skimmings may be recovered in available form.

I do not intend to limit myself to the exact mode of treatment which I have herein shown and described, as the same may be modified somewhat in detail by those skilled in the art; nor do I limit myself to the use of the particular apparatus which I have indicated in the drawings, since various forms of apparatus capable of carrying out the process are well known to chemists and others skilled in this art.

What I claim is:—

1. In the art of reclaiming ammonium and zinc values from sal-ammoniac flux skimmings, the method which consists in digesting the flux skimmings with water and steam while grinding the same by attrition to disintegrate the skimmings, separating the insoluble oxids and oxychlorid of zinc from metallic zinc and soluble zinc and ammonium salts by agitation, settling and filtration, mixing the zinc oxid and oxychlorid with lime in quantities equivalent to the chlorin contained in the oxychlorid, furnacing the mixture to decompose the oxychlorid of zinc and form oxid of zinc and chlorid of calcium, then dissolving the chlorid of calcium by digesting with warm water, and filtering to remove chlorid of calcium and to recover the zinc as oxid of zinc; substantially as described.

2. In the art of reclaiming ammonium and zinc values from sal-ammoniac skimmings, the step which consists in treating the skimmings to dissolve out the soluble salts, then furnacing the oxid and oxychlorid of the zinc with lime to form chlorid of calcium and oxid of zinc and dissolving the chlorid of calcium, whereby the oxid of zinc is recovered; substantially as described.

3. In the art of reclaiming ammonium and zinc values from sal-ammoniac skimmings, the process which consists in digesting said skimmings with water to dissolve the soluble salts, heating the insoluble residue with an oxid the basic radical of which has a soluble chlorid, whereby the chlorin compounds of zinc are converted into oxid of zinc and the basic radical unites with the chlorin of the zinc chlorids to form the chlorid of said basic radical and dissolving the chlorid of said basic radical, whereby the zinc oxid is recovered, substantially as described.

4. In the art of reclaiming ammonium and zinc values from sal-ammoniac skimmings, the process which consists in treating said skimmings with water to dissolve the soluble salts, removing the solution thus obtained, heating the insoluble residue with an oxid of a basic radical having a soluble chlorid whereby oxychlorid of zinc is oxidized to zinc oxid and the chlorid of said basic radical is formed and treating said mixture with water, whereby the soluble chlorids are dissolved and the oxid of zinc is obtained in a pure condition, substantially as described.

5. In the art of reclaiming ammonium and zinc values from sal-ammoniac skimmings, the process which consists in treating said skimmings with water to dissolve the soluble salts, removing the solution thus obtained, heating the insoluble residue with an oxid of a basic radical having a soluble chlorid whereby oxychlorid of zinc is oxidized to zinc oxid and the chlorid of said basic radical is formed, and treating said mixture with water whereby the soluble chlorids are dissolved and the oxid of zinc is obtained in a pure condition, substantially as described.

6. In the art of reclaiming ammonium and zinc values from sal-ammoniac skimmings, the process which consists in treating the skimmings with water to dissolve the soluble salts, heating the residual oxid and oxychlorid of zinc with the oxid of a strong basic radical whereby the zinc oxychlorid is converted into oxid of zinc and the chlorid of said basic radical is formed, and treating said mixture with water whereby the soluble chlorids are dissolved and the oxid of zinc is obtained in a pure condition, substantially as described.

7. In the art of reclaiming ammonium and zinc values from sal-ammoniac skimmings, the step which consists in treating the skimmings with water to dissolve the soluble salts, heating the residual zinc compounds including zinc oxychlorid with lime to convert the oxychlorid of zinc into oxid of zinc and the lime into chlorid of calcium, and treating the mixture with water whereby the chlorid of calcium is dissolved leaving oxid of zinc in a pure condition, substantially as described.

In testimony whereof, I have hereunto set my hand.

JOSEPH McFETRIDGE.

Witnesses:
R. D. LITTLE,
H. M. CORWIN.